(12) United States Patent
Machida et al.

(10) Patent No.: US 10,804,575 B2
(45) Date of Patent: Oct. 13, 2020

(54) SECONDARY BATTERY SYSTEM AND METHOD FOR DIAGNOSING ABNORMALITY IN BATTERY PACK

(71) Applicant: TOYOTA JIDOSHA KABUSHIKI KAISHA, Toyota-shi, Aichi-ken (JP)

(72) Inventors: Kiyohito Machida, Aichi-gun (JP); Yoshihiro Uchida, Nagakute (JP); Masaki Uchiyama, Obu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 127 days.

(21) Appl. No.: 16/227,768

(22) Filed: Dec. 20, 2018

(65) Prior Publication Data

US 2019/0198945 A1 Jun. 27, 2019

(30) Foreign Application Priority Data

Dec. 25, 2017 (JP) .................................. 2017-248176

(51) Int. Cl.
*H02J 7/00* (2006.01)
*H01M 10/00* (2006.01)
*H01M 10/48* (2006.01)
*H01M 10/46* (2006.01)

(52) U.S. Cl.
CPC ......... *H01M 10/482* (2013.01); *H01M 10/46* (2013.01); *H02J 7/0013* (2013.01); *H02J 7/0021* (2013.01); *H02J 7/0026* (2013.01); *H02J 7/0047* (2013.01); *H01M 2220/20* (2013.01)

(58) Field of Classification Search
None
See application file for complete search history.

(56) References Cited

U.S. PATENT DOCUMENTS 8,742,725 B2 * 6/2014 Tsujiko ................. H01M 10/48
320/132
9,203,255 B2 * 12/2015 Hong ...................... B60L 58/12

FOREIGN PATENT DOCUMENTS

JP 2006-337155 A 12/2006
JP 2009-216448 A 9/2009

\* cited by examiner

*Primary Examiner* — Leigh M Garbowski
(74) *Attorney, Agent, or Firm* — Sughrue Mion, PLLC

(57) ABSTRACT

A battery pack includes a plurality of modules connected in series to one another. Each of the plurality of modules includes a plurality of cells connected in parallel to one another. If a first condition and a second condition are satisfied, an ECU diagnoses an abnormality in which a current path of a cell included in any module breaks. The first condition is a condition that the voltage difference between the maximum voltage and the minimum voltage among a plurality of voltage values is less than a reference value before execution of plug-in charging control, each of the plurality of voltage values being detected by a corresponding one of a plurality of voltage sensors. The second condition is a condition that the voltage difference between the maximum voltage and a voltage is more than or equal to the reference value after execution of the plug-in charging control.

6 Claims, 10 Drawing Sheets

FIG.8A  <BALANCING DETERMINATION PROCESS>
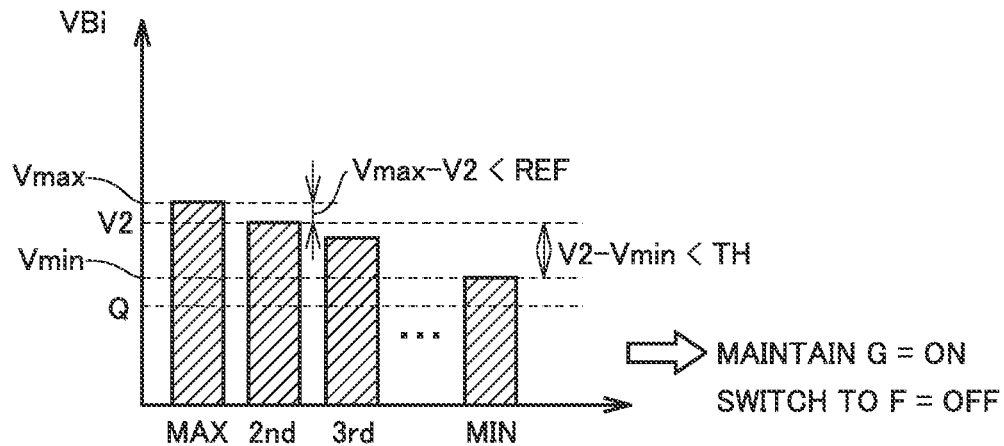
FIG.8B
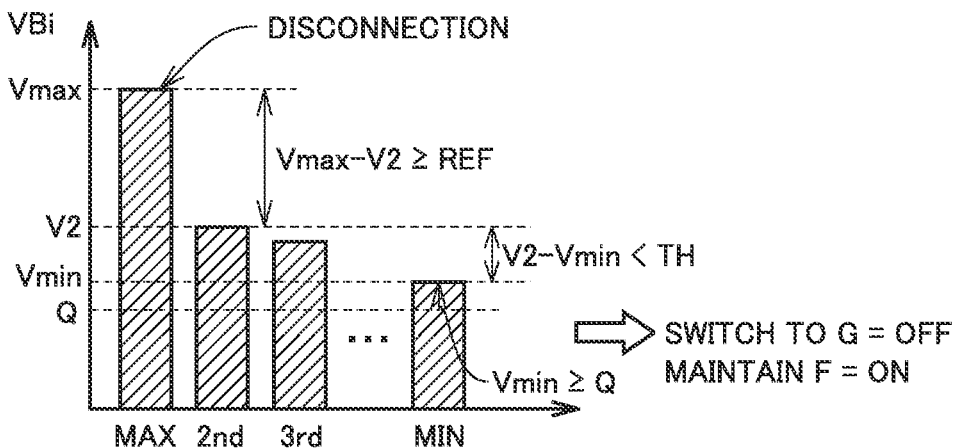
FIG.8C
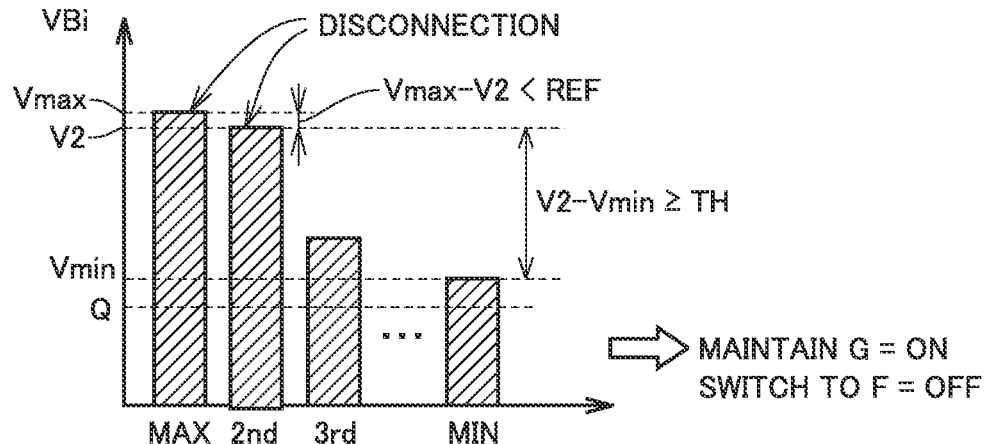

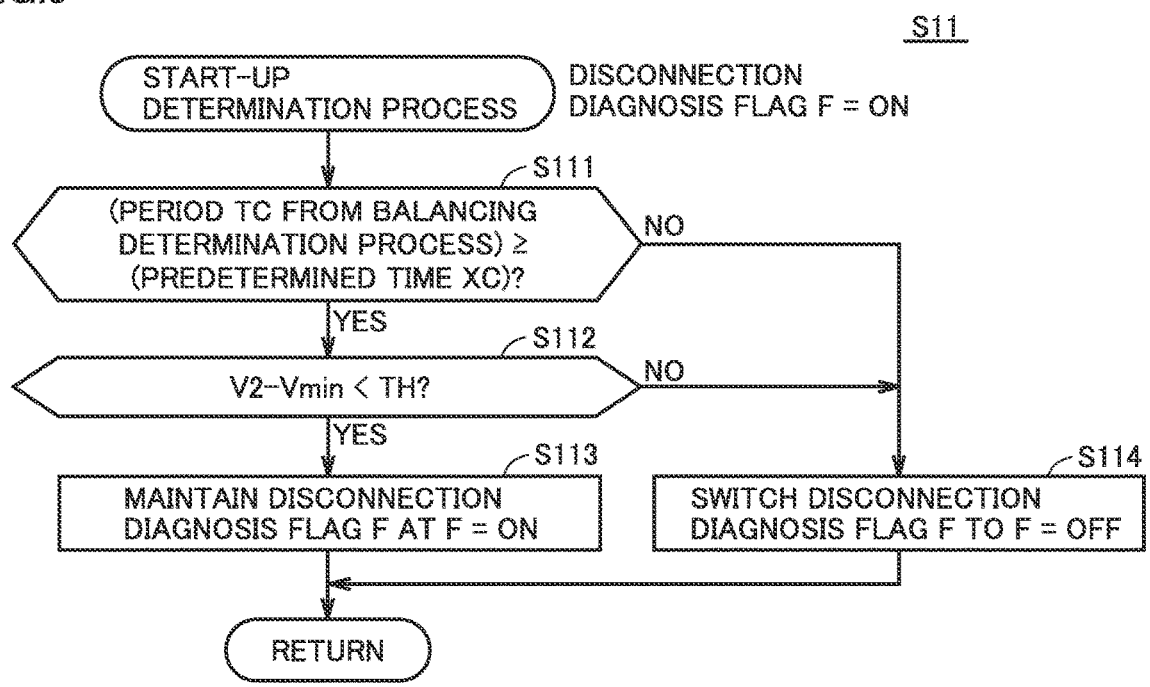

SECONDARY BATTERY SYSTEM AND METHOD FOR DIAGNOSING ABNORMALITY IN BATTERY PACK

This nonprovisional application is based on Japanese Patent Application No. 2017-248176 filed on Dec. 25, 2017 with the Japan Patent Office, the entire contents of which are hereby incorporated by reference.

BACKGROUND

Field

The present disclosure relates to a secondary battery system and a method for diagnosing abnormality in a battery pack, and particularly to a technique, in a battery pack including a plurality of modules each having a plurality of cells connected in parallel to one another, to determine the presence or absence of abnormality in which the current path of a cell breaks.

Description of the Background Art

In recent years, vehicles having a battery pack have been developed, such as hybrid vehicles and electric vehicles. A known battery pack for such vehicles includes a plurality of modules (also referred to as blocks) connected in series to one another, each of the plurality of modules including a plurality of cells connected in parallel to one another.

In a battery pack having such a configuration, when the fuse for any cell in a certain module melts, for example, the current path of the cell may break. In the present disclosure, such a break in current path is also referred to as "occurrence of abnormality". When an abnormality occurs, the current that should have been flowing through the abnormal cell flows through the other normal cells (the remaining cells of the parallel-connected cells). Accordingly, in the module including the abnormal cell, the current flowing through the normal cells is increased as compared with a module in which all the cells are normal. As a result, excessive current may flow through the normal cells in the module including the abnormal cell, and the normal cells may not be properly protected. Therefore, it is necessary to determine whether or not an abnormality has occurred in any module.

A module including an abnormal cell is smaller in full charge capacity than a module in which all the cells are normal. Accordingly, in a module including an abnormal cell, the amount of change in state of charge (SOC) associated with charging and discharging of the battery pack is larger than in a module in which all the cells are normal. The SOC has a correlation with the open circuit voltage (OCV). Therefore, the presence or absence of abnormality can be determined by detecting the OCVs (the voltages of the battery pack with no load) of the modules with voltage sensors and by comparing the detected OCVs among the modules (see, for example, Japanese Patent Laying-Open No. 2006-337155).

SUMMARY

However, depending on the number of cells in a module, the OCV may not change so much when an abnormality occurs (see below for details). Accordingly, the differences in OCV due to occurrence of abnormality may not be clearly distinguished from mere OCV variations (variations of the OCV related to manufacturing or aging), thus leading to low accuracy in determination of the presence or absence of abnormality.

The present disclosure has been made to solve the above problem, and an object of the present disclosure is to improve accuracy in determination of the presence or absence of abnormality in the modules of a battery pack.

(1) A secondary battery system according to one aspect of the present disclosure is mountable on a vehicle. The secondary battery system comprises a battery pack to be charged by external charging control with electric power supplied from outside of the vehicle. The battery pack includes a plurality of modules connected in series to one another. Each of the plurality of modules includes a plurality of cells connected in parallel to one another. The secondary battery system further comprises a plurality of voltage sensors each provided for a corresponding one of the plurality of modules and each configured to detect a voltage (preferably, the OCV) of a corresponding one of the plurality of modules. The secondary battery system further comprises a controller configured to execute the external charging control. The controller is configured to, if a first condition and a second condition are satisfied, diagnose (or determine) an abnormality in which a current path of a cell breaks, the cell being included in a module among the plurality of modules. The first condition is a condition that the voltage difference between the maximum voltage value and the minimum voltage value among a plurality of voltage values is less than a reference value before execution of the external charging control, each of the plurality of voltage values being detected by a corresponding one of the plurality of voltage sensors. The second condition is a condition that the voltage difference between the maximum voltage value and another voltage value among the plurality of voltage values (a voltage value other than the maximum voltage value and the minimum voltage value) is more than the reference value after execution of the external charging control.

According to the feature of the above (1), if the voltage difference between the maximum voltage value and the minimum voltage value was less than the reference value before execution of the external charging control (the first condition was satisfied) and the voltage difference between the maximum voltage value and another voltage is more than the reference value after execution of the external charging control (the second condition is satisfied), then it is determined that the external charging control for the battery pack has produced voltage differences related to the differences in full charge capacity and thus an abnormality has occurred in any of the modules (specifically, the module that shows the maximum voltage value). The first condition being satisfied means that the voltage differences among the modules were sufficiently small before execution of the external charging. The second condition being satisfied means that there is a module (the module that shows the maximum voltage value) that has a large voltage difference from another module after execution of the external charging. Therefore, according to the above feature, the presence or absence of abnormality in the modules of the battery pack can be determined with higher accuracy than with no determination as to whether or not the first condition is satisfied.

(2) The controller is configured to determine that the abnormality has occurred in the module, if a third condition and a fourth condition are satisfied in addition to the first condition and the second condition. The third condition is a condition that the maximum voltage value is less than a first predetermined voltage value before execution of the external charging control. The fourth condition is a condition that the minimum voltage value is more than a second predetermined voltage value after execution of the external charging control. The second predetermined voltage value is more than or equal to the first predetermined voltage value.

External charging that provides only low charge amount for the battery pack will produce only small voltage differences among the modules even when the battery pack includes an abnormal module. On the other hand, if the third and fourth conditions are satisfied in the feature of the above (2), it indicates that the external charging has provided sufficiently high charge amount for the battery pack. Accordingly, the external charging produces larger voltage differences among the modules. Thus, the accuracy is further improved in determining the presence or absence of abnormality in the modules of the battery pack.

(3) The above-described other voltage value (the voltage value other than the maximum voltage value and the minimum voltage value) is the second highest voltage value among the plurality of voltage values. The controller is configured to diagnose the abnormality in the module that shows the maximum voltage value, if a condition that the voltage difference between the second highest voltage value and the minimum voltage value is less than a threshold value is satisfied after execution of the external charging control.

According to the feature of the above (3), the second highest voltage value is employed as the above-described other voltage, the details of which will be described later (see FIG. 8A to FIG. 8C). The feature of the above (3) employs the second highest voltage value as a voltage value for comparison, and determines whether or not the condition that the voltage difference between the second highest voltage value and the minimum voltage value is less than the threshold value is satisfied. This allows for highly accurate diagnosis of abnormality for a module that shows the maximum voltage value among the modules included in the battery pack.

(4) The controller is configured to determine whether or not the second condition and the fourth condition are satisfied, if a start-up operation for a traveling system of the vehicle is executed by a user after execution of the external charging control.

Depending on the usage of the vehicle, a long period of time (e.g. a half year or one year) may elapse from execution of the external charging control to the start-up operation by the user, and the state of the battery pack may change during that period. According to the feature of the above (4), whether or not the second and fourth conditions are satisfied is determined after the user executes the start-up operation. Thus, the presence or absence of abnormality can be determined in accordance with the state of the battery pack after the change.

(5) The secondary battery system further comprises a plurality of switching elements each connected in parallel to a corresponding one of the plurality of modules. If a balancing condition that a SOC difference among the plurality of modules is more than a predetermined value is satisfied, the controller is configured to execute balancing control for reducing the SOC difference by turning on any of the plurality of switching elements. During a period after execution of the external charging control to execution of the start-up operation, if at least one of the first condition and the third condition is not satisfied, the controller is configured to execute the balancing control when the balancing condition is satisfied; and if the first condition and the third condition are both satisfied, the controller is configured not to execute the balancing control when the balancing condition is satisfied.

Execution of the balancing control reduces the voltage differences among the modules. Accordingly, in the feature of the above (5), if the first and third conditions are both satisfied, the balancing control is not executed even when the balancing condition is satisfied, in preparation for the abnormality diagnosis. On the other hand, if at least one of the first and third conditions is not satisfied, the balancing control is executed when the balancing condition is satisfied, with no execution of the abnormality diagnosis. This reduces the voltage differences among the modules and expands the voltage range of charging and discharging of the battery pack, thus enabling full use of the battery pack.

(6) A method for diagnosing abnormality in a battery pack according to another aspect of the present disclosure determines an abnormality in a battery pack mounted on a vehicle. The battery pack includes a plurality of modules to be charged by external charging control with electric power supplied from outside of the vehicle, the plurality of modules being connected in series to one another. Each of the plurality of modules includes a plurality of cells connected in parallel to one another. The method for diagnosing abnormality in a battery pack comprises: detecting voltages of the plurality of modules using a plurality of voltage sensors, each of the plurality of voltage sensors being provided for a corresponding one of the plurality of modules; and, if a first condition and a second condition are satisfied, diagnosing an abnormality in which a current path of a cell breaks, the cell being included in a module among the plurality of modules. The first condition is a condition that the voltage difference between the maximum voltage value and the minimum voltage value among a plurality of voltage values is less than a reference value before execution of the external charging control, each of the plurality of voltage values being detected by a corresponding one of the plurality of voltage sensors. The second condition is a condition that the voltage difference between the maximum voltage value and another voltage value among the plurality of voltage values (a voltage value other than the maximum voltage value and the minimum voltage value) is more than the reference value after execution of the external charging control.

According to the method of the above (6), an abnormality in the modules of the battery pack can be diagnosed with improved accuracy, as with the feature of the above (1).

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8A is a first diagram for explaining the determination method in the balancing determination process.

FIG. 8B is a second diagram for explaining the determination method in the balancing determination process.

FIG. 8C is a third diagram for explaining the determination method in the balancing determination process.

FIG. 9 is a flowchart showing a start-up determination process.

DESCRIPTION OF THE PREFERRED EMBODIMENTS

Figure 1:
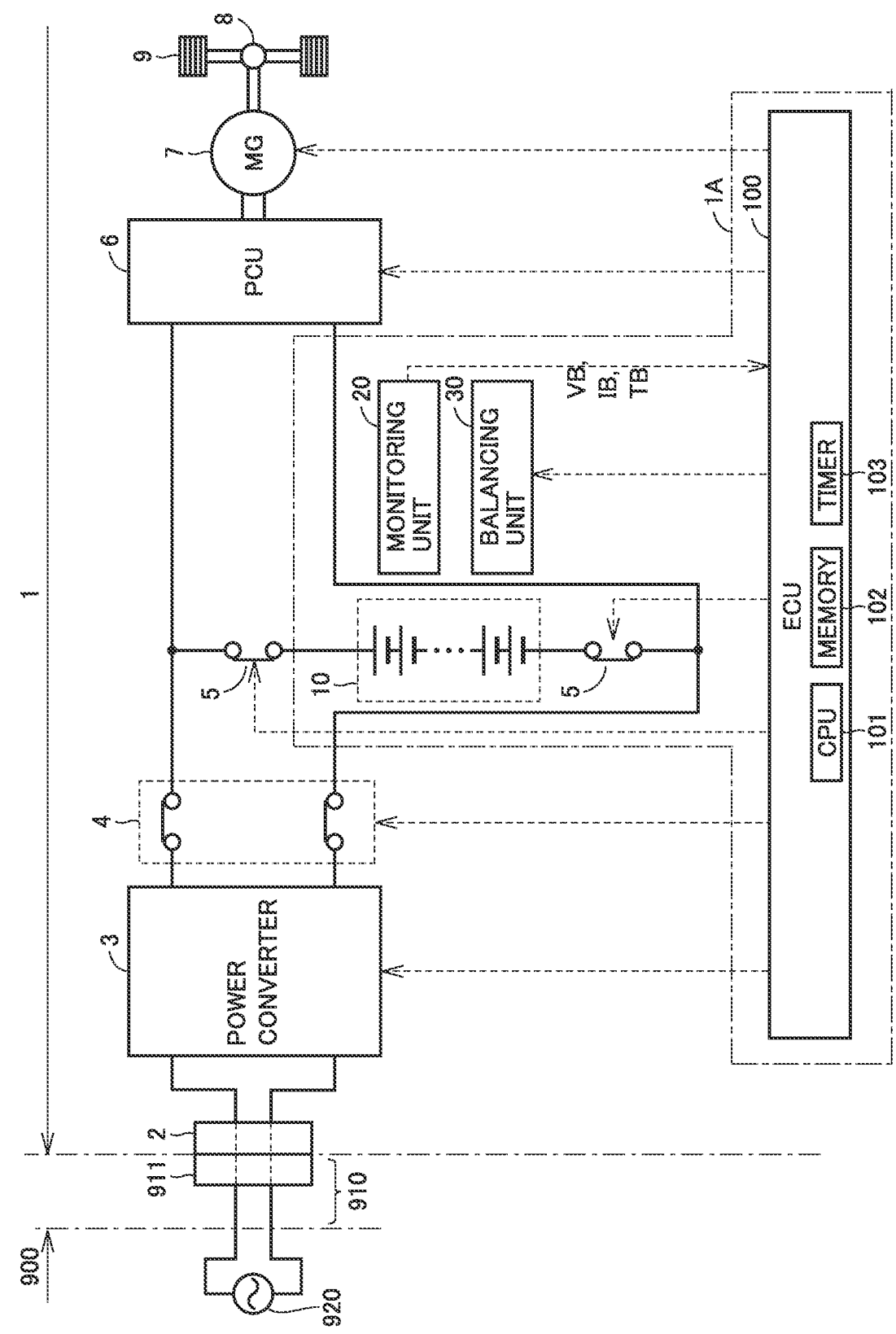
FIG. 1 is a module diagram schematically showing a general configuration of a vehicle according to the present embodiment.

An embodiment of the present disclosure is described in detail hereinafter with reference to the drawings. Identical or corresponding parts in the drawings are identically denoted, and the explanation thereof is not repeated.

The following embodiment describes, as an "abnormality" in a cell, "disconnection" that occurs when the current path of a cell breaks due to melting of the fuse for the cell or due to activation of a current interrupt device (CID). The disconnection is an example of abnormality according to the present disclosure. The abnormality in which the current path of a cell breaks may be in any other form. For example, disconnection may occur due to bad contact of a bus bar that connects the cells, or due to removal of a cell terminal solder. The "abnormality" also includes breaking of current in any cell due to excessive increase in internal resistance of the cell.

Embodiment

<Configuration of Vehicle>

FIG. 1 is a module diagram schematically showing a general configuration of a vehicle according to the present embodiment. A vehicle 1 is, for example, an electric vehicle and is configured to be electrically connected to charging equipment 900 outside of the vehicle via a charging cable 910. Charging equipment 900 supplies vehicle 1, via charging cable 910, with AC power from a system power supply (e.g. a commercial power supply) 920.

Vehicle 1 includes an inlet 2, a power converter 3, a charge relay (CHR) 4, a system main relay (SMR) 5, a power control unit (PCU) 6, a motor generator 7, a drive-train gear 8, a driving wheel 9, and a secondary battery system 1A. Secondary battery system 1A includes a battery pack 10, a monitoring unit 20, a balancing unit 30, and an ECU 100. Vehicle 1 may be a plug-in hybrid vehicle which further includes an engine (not shown).

Inlet 2 is configured to be mechanically coupled (fitted, inserted or the like) to a connector 911 provided at an end of charging cable 910. This allows electrical connection between vehicle 1 and charging equipment 900 so that charging equipment 900 can supply electric power to vehicle 1. The control for charging battery pack 10 of vehicle 1 with electric power supplied from charging equipment 900 is also referred to as "plug-in charging control" (or simply "plug-in charging"). The plug-in charging control is one form of the "external charging control" according to the present disclosure.

Power converter 3 is configured with, for example, an AC/DC converter (not shown) and converts AC power supplied from charging equipment 900 into DC power to charge battery pack 10. If DC power is supplied from charging equipment 900, power converter 3 may be configured with a DC/DC converter.

CHR 4 is electrically connected to the power line that connects power converter 3 and SMR 5 to each other. The closing/opening of CHR 4 is controlled in accordance with the control signal from ECU 100.

SMR 5 is electrically connected to the power line that connects PCU 6 and battery pack 10 to each other. The closing/opening of SMR 5 is controlled in accordance with the control signal from ECU 100. When CHR 4 and SMR 5 are both closed, electric power can be transferred between inlet 2 and battery pack 10.

PCU 6 performs bidirectional power conversion between battery pack 10 and motor generator 7 in accordance with the control signal from ECU 100.

Motor generator 7 is an AC motor, such as a three-phase AC synchronous motor having a rotor with an embedded permanent magnet. The torque outputted from motor generator 7 transfers through drive-train gear 8, comprising a reduction drive and a motive power dividing mechanism, to driving wheel 9, thereby causing vehicle 1 to travel. At the time of regenerative braking of vehicle 1, motor generator 7 can generate power with the rotating force from driving wheel 9.

Battery pack 10 supplies electric power for motor generator 7 to generate torque. Battery pack 10 stores electric power generated by motor generator 7. Battery pack 10 comprises a plurality of cells of secondary battery, such as lithium-ion secondary battery or nickel-hydrogen battery as typical examples. In the present embodiment, each cell is a lithium-ion secondary battery.

Figure 2:
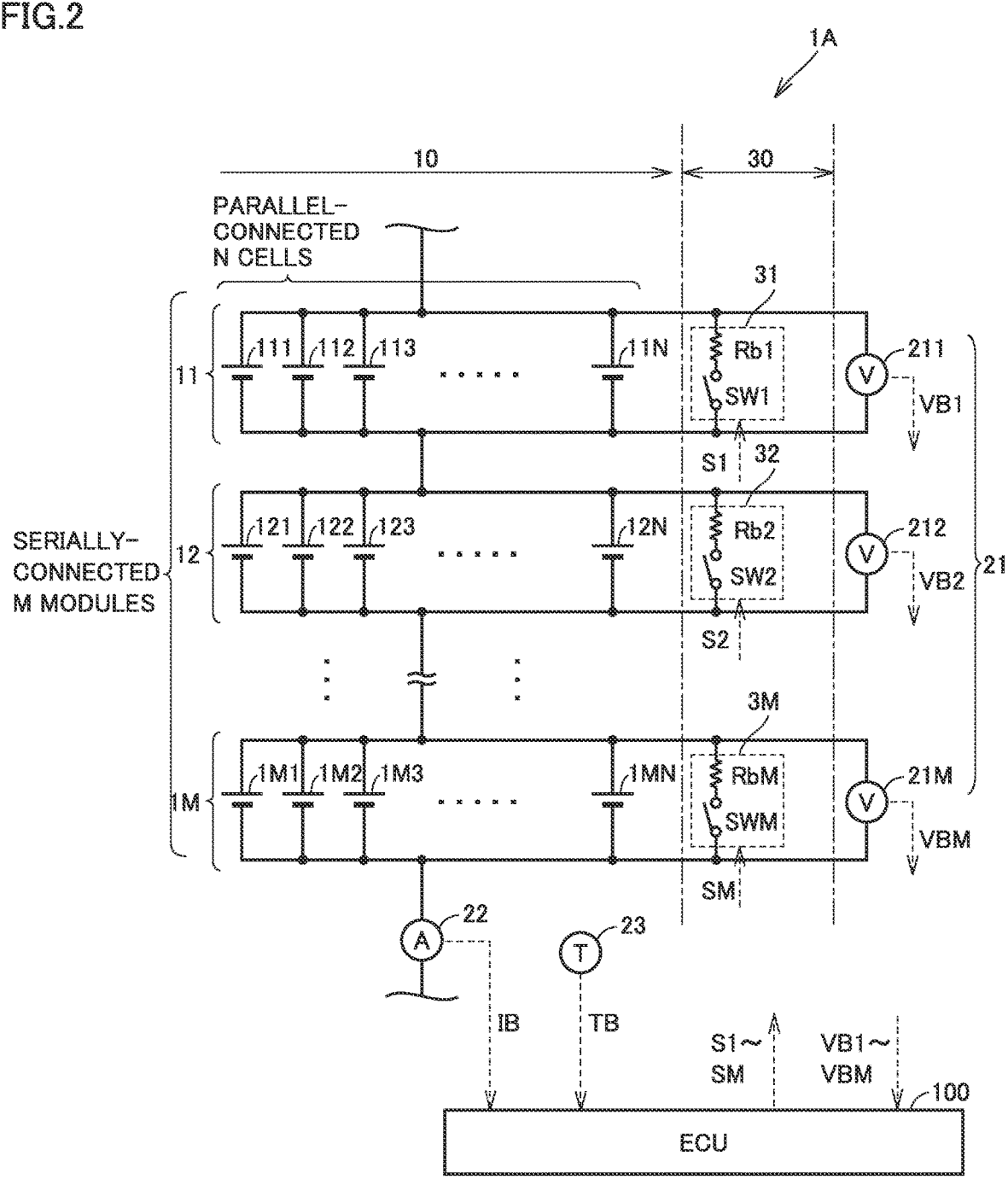
FIG. 2 shows the configuration of a battery pack, a monitoring unit, and a balancing unit in more detail.

Monitoring unit 20 includes a voltage sensor 21, a current sensor 22, and a temperature sensor 23, which are shown in FIG. 2, and monitors the state of battery pack 10.

Balancing unit 30 is provided to correct imbalance in state of charge (SOC) among modules 11 to 1M (see FIG. 2) included in battery pack 10. The configuration of battery pack 10, monitoring unit 20, and balancing unit 30 will be described later in more detail with reference to FIG. 2.

ECU 100 is configured with a central processing unit (CPU) 101, a memory (specifically, a read only memory [ROM] and a random access memory [RAM]) 102, a timer 103, and an input/output port (not shown) for inputting and outputting various types of signals. ECU 100 controls battery pack 10 based on a signal received from each sensor of monitoring unit 20 and based on a program and a map (each map described later) stored in memory 102. Examples of the main control to be executed by ECU 100 include a "disconnection diagnosis process" for battery pack 10 and a "balancing control" for battery pack 10. These processes and control will be described in detail later.

FIG. 2 shows the configuration of battery pack 10, monitoring unit 20, and balancing unit 30 in more detail. With reference to FIG. 2, battery pack 10 includes M modules 11 to 1M connected in series to one another. Each of modules 11 to 1M includes N cells connected in parallel to one another. M and N are each a natural number of 2 or more.

Although not shown, adjacent cells are electrically and mechanically connected to each other by bus bar. To each cell, a fuse (not shown) is connected in series. When excessive current flows, the fuse breaks the current path of the cell. Inside of each cell, a current interrupt device (CID) (not shown) is provided. The CID is configured to activate to interrupt the current path when the pressure (internal pressure) in the battery case is more than or equal to a predetermined value.

Voltage sensor 211 detects a voltage VB1 of module 11. Specifically, voltage sensor 211 detects voltages of N cells 111 to 11N constituting module 11. Ditto for voltage sensors 212 to 21M. Current sensor 22 detects a current IB inputted to and outputted from battery pack 10. Temperature sensor 23 detects a temperature TB of battery pack 10. Each sensor outputs the detection result to ECU 100.

In battery pack 10, with the passage of time, the SOC may vary among modules 11 to 1M due to, for example, variations in self-discharge current among modules 11 to 1M, or due to variations in current consumption among voltage sensors 211 to 21M. Variations in voltage among modules 11 to 1M may be caused also by variations in charging efficiency.

When ECU 100 acquires voltages VB1 to VBM of modules 11 to 1M from voltage sensors 211 to 21M, respectively, ECU 100 estimates the SOC of each of modules 11 to 1M. When a predetermined condition is satisfied (e.g. when the differences in SOC among modules 11 to 1M are more than a predetermined value), ECU 100 outputs control signals S1 to SM for balancing control. In accordance with control signals S1 to SM from ECU 100, balancing unit 30 discharges any of modules 11 to 1M (one or more module) until voltages VBi are substantially the same. Specifically, balancing unit 30 includes balancing circuits 31 to 3M. Balancing circuit 31 is connected in parallel to module 11 and includes a bypass resistance Rb1 and a switching element (e.g. transistor) SW1 as in a typical balancing circuit. Ditto for the other balancing circuits 32 to 3M. Closing switching elements SW1 to SWM allows discharge of the modules. This control is referred to as "balancing control".

Although not shown in FIG. 2, a dedicated integrated circuit (typically referred to as a monitoring integrated circuit [IC]) may be provided for monitoring the voltage and current of each cell. The SOC has a correlation with the open circuit voltage (OCV), in which the OCV monotonously increases with the increase in SOC. Therefore, the object of balancing may be the OCV.

<Disconnection Diagnosis Process>

In battery pack 10 configured as described above, when the fuse for any cell melts or the CID is activated in a certain module, the current path of the cell may break (in other words, disconnection may occur). Then, the current that should have been flowing through the cell flows through the other normal cells (the remaining cells connected in parallel to the disconnected cell). Accordingly, in the module including the disconnected cell, the current flowing through the normal cells is increased as compared with a module including no disconnection. As a result, excessive current may flow through the normal cells in the module including the disconnected cell, and the normal cells may not be properly protected. Therefore, it is necessary to determine whether or not disconnection has occurred in any module.

In view of such circumstances, in the present embodiment, a "disconnection diagnosis process" for battery pack 10 is executed to determine whether or not disconnection has occurred in any of modules 11 to 1M. Specifically, a module including a disconnected cell is smaller in full charge capacity than a module in which all the cells are normal. Accordingly, in a module including a disconnected cell, the amount of change in SOC associated with charging and discharging of battery pack 10 is larger than in a module in which all the cells are normal. As is well known, there is a correlation between the SOC and the OCV. Thus, the OCVs of modules 11 to 1M, i.e., voltages VBi (i=1 to M) of battery pack 10 with no load, are detected with voltage sensor 21. By comparing the OCVs (voltages VBi) among modules 11 to 1M, the presence or absence of disconnection can be determined.

If, for example, each module has 15 cells (N=15) and one of the cells has disconnection, however, the difference in full charge capacity is at most several percent between a module including 15 normal cells and a module including 14 normal cells. Accordingly, the difference in OCV is also relatively small. Therefore, the difference in OCV may not be clearly distinguished from OCV variations (manufacturing variations or aging variations), thus leading to low accuracy in diagnosis of disconnection.

Accordingly, the present embodiment executes a determination process (the pre-charging determination process described later) before execution of the disconnection diagnosis process. The determination process is for determining whether or not the condition suitable for execution of the disconnection diagnosis process is satisfied.

<Outline of Processes>

Figure 3:
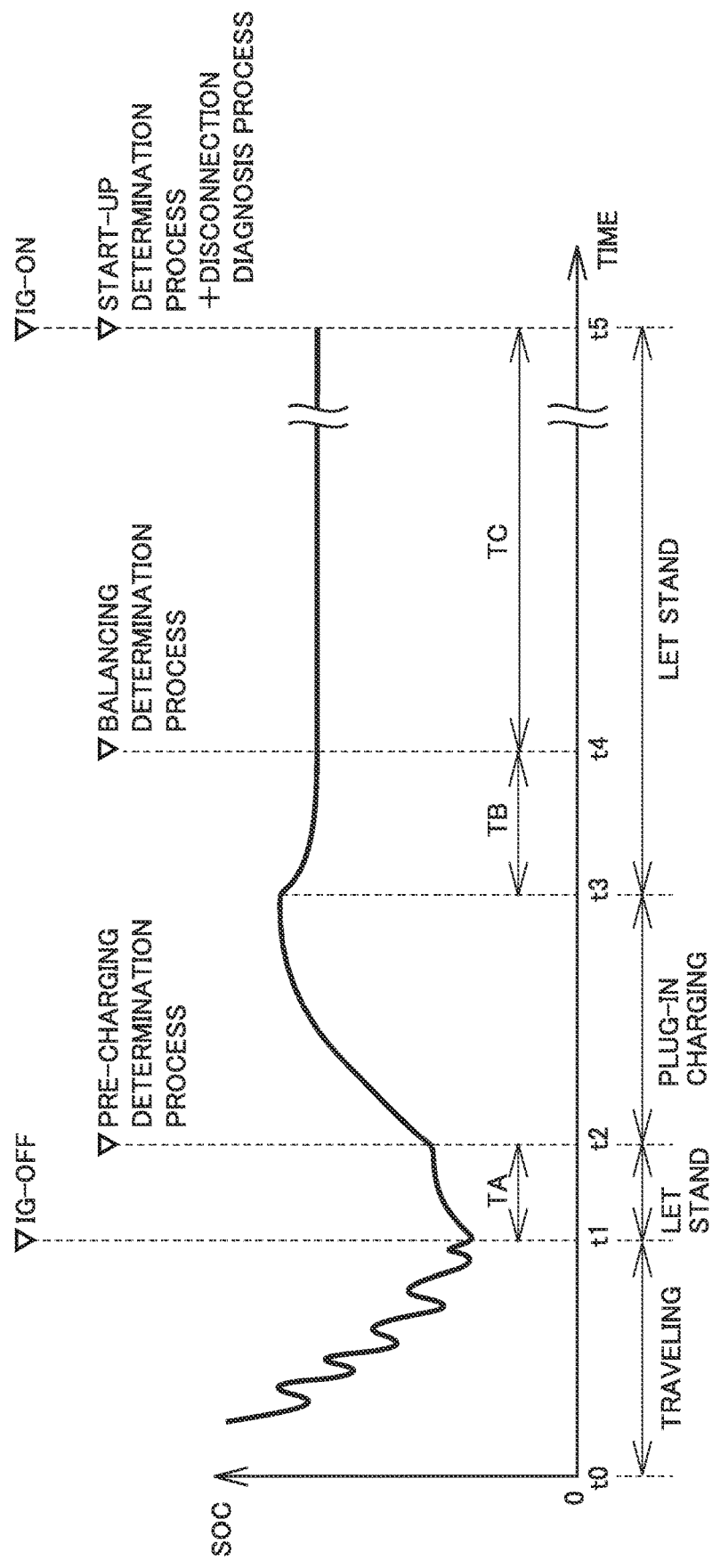
FIG. 3 is a timing chart for explaining the outline of a series of processes up to a disconnection diagnosis process for battery pack.

FIG. 3 is a timing chart for explaining the outline of a series of processes up to the disconnection diagnosis process for battery pack 10. In FIG. 3, the horizontal axis represents the elapsed time. The vertical axis represents the SOC of battery pack 10. The vertical axis may be converted into the OCV of battery pack 10 (for example, the average OCV of all cells).

With reference to FIG. 3, during the period from time t0 to time t1, vehicle 1 is traveling. While vehicle 1 is traveling, the SOC of battery pack 10 basically decreases but may also increase a little due to regenerative braking of vehicle 1. At time t1, vehicle 1 stops traveling, and the user performs an operation for turning off the ignition of vehicle 1 (IG-OFF operation). During period TA from time t1 to time t2, vehicle 1 is let stand. During this let-stand period (and during period TB from time t3 to time t4 described later), the apparent SOC of battery pack 10 increases due to increase in OCV associated with elimination of polarization in battery pack 10.

After that, connector 911 of charging cable 910 is connected to inlet 2 by the user, and plug-in charging is started at time t2. Before the start of plug-in charging, a "pre-charging determination process" is executed. The "pre-charging determination process" is for determining whether or not the disconnection diagnosis process for battery pack 10 will be executed after the user performs an operation for turning on the ignition (IG-ON operation) next time.

The SOC of battery pack 10 increases during the plug-in charging, and the plug-in charging is completed at time t3. After that, vehicle 1 is let stand again. During the let-stand period after the completion of the plug-in charging (the period after time t3), ECU 100 is started up at regular intervals (e.g. every hour) to determine whether to execute the balancing control for battery pack 10. The process for this determination is referred to as a "balancing determination process". In the example shown in FIG. 3, the first balancing determination process at time t4 determines not to execute the balancing control until the next IG-ON operation. The details will be described later.

When the IG-ON operation is performed by the user at time t5 after an elapse of period TC from time t4, a "start-up determination process" is executed for determining whether to execute the disconnection diagnosis process for battery pack 10. If both the pre-charging determination process and the start-up determination process determine that the disconnection diagnosis process should be executed, then the disconnection diagnosis process is executed.

<Disconnection Diagnosis Flow>

Figure 4:
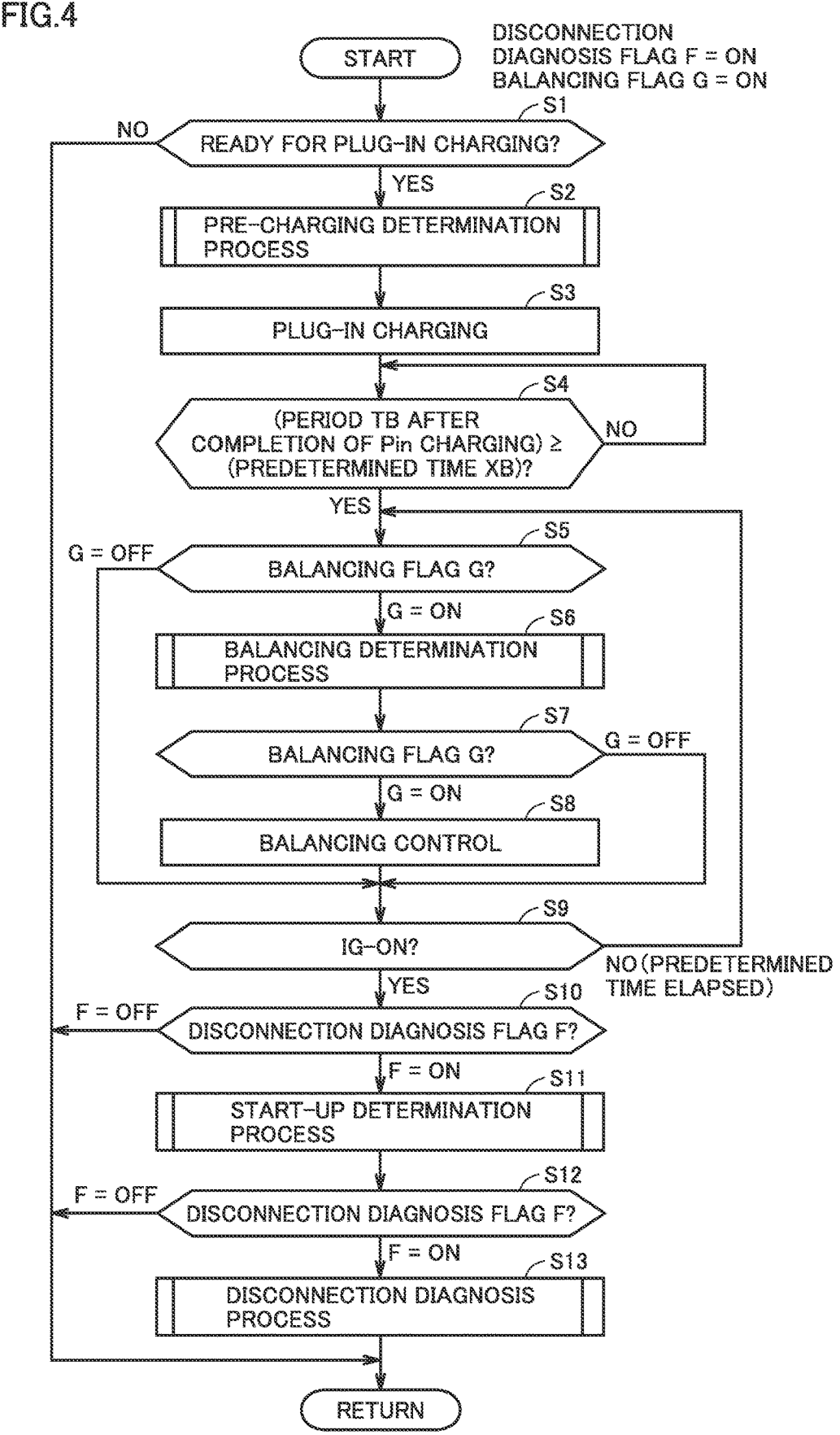
FIG. 4 is a flowchart showing the overall process related to the disconnection diagnosis for battery pack in the present embodiment.

FIG. 4 is a flowchart showing the overall process related to the disconnection diagnosis for battery pack 10 in the present embodiment. The flowchart is invoked from a main routine (not shown) for execution each time an arithmetic cycle has elapsed if a predetermined condition is satisfied. The steps (hereinafter abbreviated to "S") included in the flowchart are basically implemented by software processing by ECU 100. The steps, however, may be implemented by dedicated hardware (electric circuit) provided in ECU 100.

In the present embodiment, memory 102 of ECU 100 stores two flags for managing a series of processes. The first flag, disconnection diagnosis flag F, is used to manage execution/non-execution of the disconnection diagnosis process for battery pack 10. When disconnection diagnosis flag F is ON, the disconnection diagnosis process is executed; whereas when disconnection diagnosis flag F is OFF, the disconnection diagnosis process is not executed. The second flag, balancing flag G, is used to manage execution/non-execution of the balancing control for battery pack 10. When balancing flag G is ON, the balancing control is executed; whereas when balancing flag G is OFF, the balancing control is not executed. The initial states of disconnection diagnosis flag F and balancing flag G are both ON.

With reference to FIG. 4, at S1, ECU 100 determines whether or not vehicle 1 is ready for plug-in charging. For example, vehicle 1 is determined to be ready for plug-in charging when connector 911 of charging cable 910 is connected to inlet 2. The connection state between connector 911 of charging cable 910 and inlet 2 can be determined by ECU 100 receiving a connection confirmation signal (control pilot signal) supplied from charging cable 910 to vehicle 1 via inlet 2. If vehicle 1 is not ready for plug-in charging (NO at S1), the process is returned to the main routine without executing the subsequent processes. If vehicle 1 is ready for plug-in charging (YES at S1), ECU 100 moves the process to S2 and executes the pre-charging determination process (see time t2 in FIG. 3).

Figure 5:
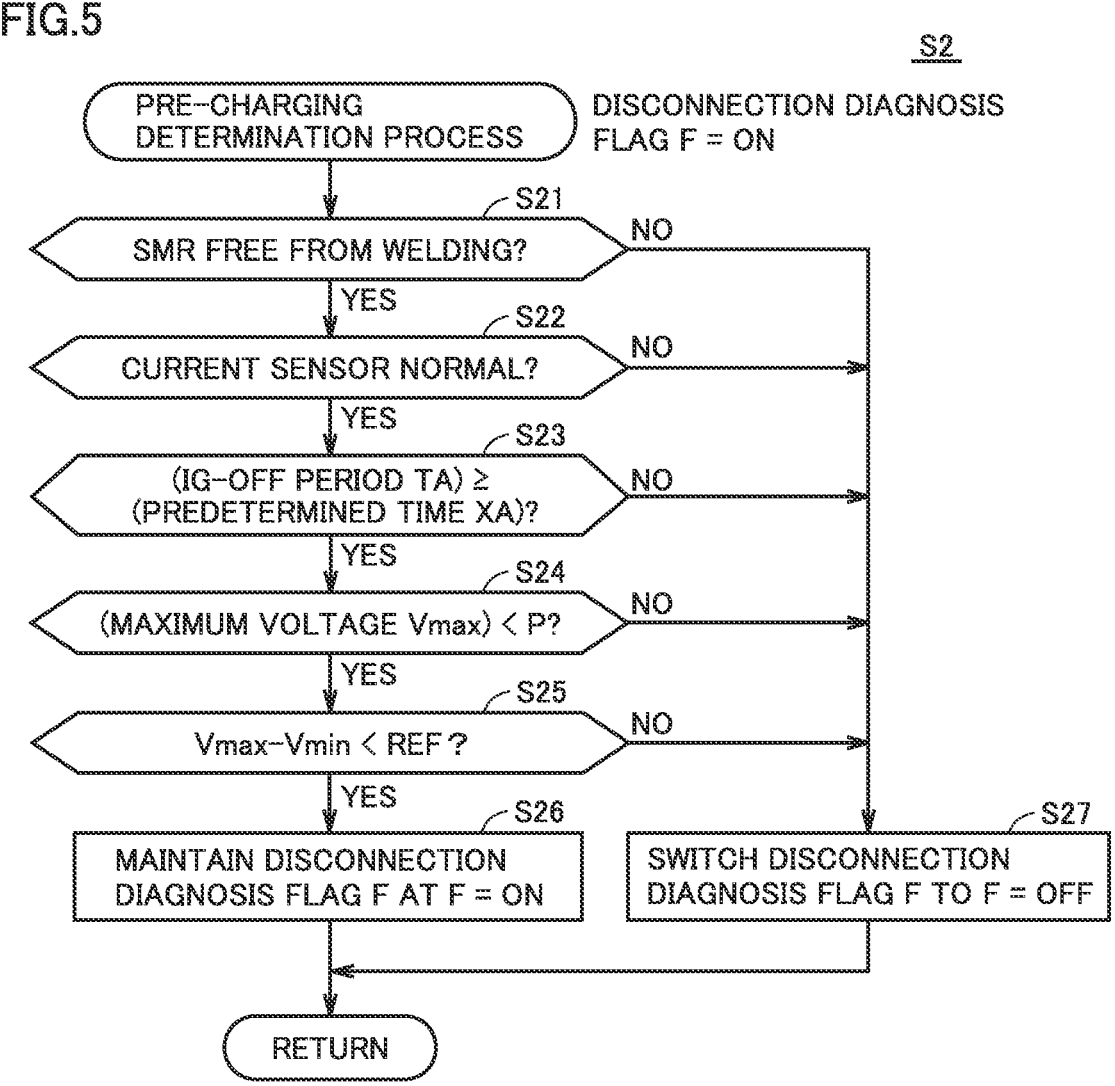
FIG. 5 is a flowchart showing a pre-charging determination process.

FIG. 5 is a flowchart showing the pre-charging determination process (the process of S2 in FIG. 4). As described above, the initial state of disconnection diagnosis flag F is ON.

With reference to FIG. 5, first, ECU 100 determines whether or not the condition for proper plug-in charging is satisfied, with CHR 4 and SMR 5 both being open. Specifically, for example, ECU 100 checks whether or not SMR 5 is free from welding (S21). Also, ECU 100 checks whether or not current sensor 22 shows abnormality in which the detection value of current sensor 22 is larger than a predetermined value (i.e., current sensor 22 indicates charging or discharging current larger than a predetermined value) when the plug-in charging has not started (S22). If such an abnormality is detected (NO at S21 or NO at S22), disconnection diagnosis flag F is switched from ON to OFF (S27). That is, the disconnection diagnosis process is not executed.

If the condition for proper plug-in charging is satisfied (YES at both S21 and S22), ECU 100 further determines whether or not the following three conditions are satisfied.

At S23, ECU 100 determines whether or not period TA (see FIG. 3) from the IG-OFF operation to execution of the pre-charging determination process is more than or equal to a predetermined time XA. Immediately after the IG-OFF operation for vehicle 1, there may still be lingering polarization that was generated in battery pack 10 due to charging or discharging of battery pack 10 before the IG-OFF operation (during traveling of vehicle 1). If that happens, the accuracy in determination at the subsequent processes of S24 and S25 using voltage VBi (or the voltage difference) may be reduced. To prevent this, a time required for eliminating the polarization in battery pack 10 is set in advance as predetermined time XA (for example, 30 minutes). If period TA from the IG-OFF operation is less than predetermined time XA (NO at S23), then it is determined that the polarization in battery pack 10 may not have been eliminated, and disconnection diagnosis flag F is switched from ON to OFF (S27).

If period TA from the IG-OFF operation is more than or equal to predetermined time XA (YES at S23), ECU 100 determines that the polarization in battery pack 10 has been eliminated, and executes the processes of S24 and S25 describe below. The processes of S24 and S25 may be performed in any order, and their order can be changed.

Figure 6A:
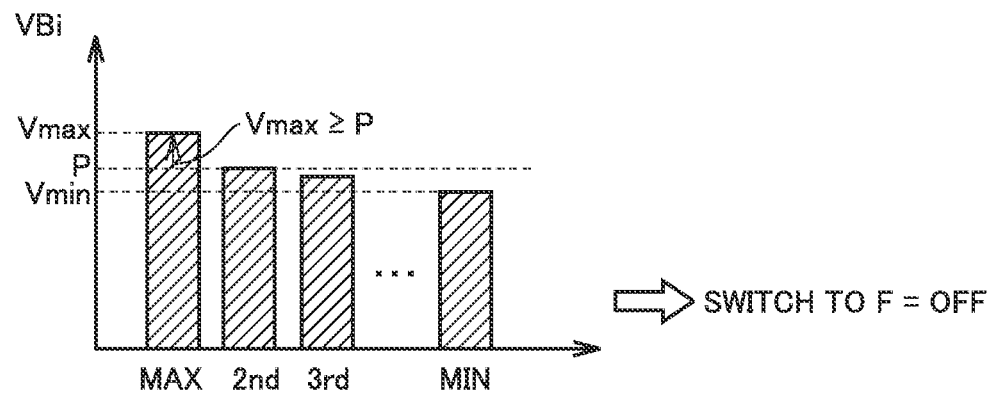
FIG. 6A is a first diagram for explaining the determination method in the pre-charging determination process.
Figure 6B:
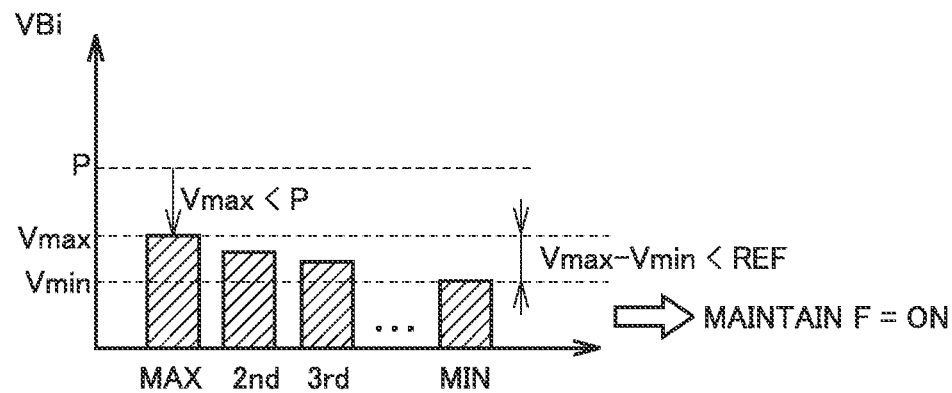
FIG. 6B is a second diagram for explaining the determination method in the pre-charging determination process.

FIG. 6A and FIG. 6B are diagrams for explaining the determination method in the pre-charging determination process (the processes of S24 and S25 in FIG. 5). In FIG. 6A, FIG. 6B, and later-described FIG. 8A to FIG. 8C, the vertical axis represents voltage VBi (i=1 to M) of modules 11 to 1M. The horizontal axis represents modules 11 to 1M in descending order of voltage VBi. In FIG. 6A, FIG. 6B and FIG. 8A to FIG. 8C, the module having the highest voltage VBi among modules 11 to 1M is denoted by "MAX", the module having the second highest voltage VBi is denoted by "2nd", the module having the third highest voltage VBi is denoted by "3rd", and the module having the lowest voltage VBi is denoted by "MIN".

FIG. 6A shows the distribution of voltages VBi (voltage distribution) of when the SOC of battery pack 10 is high to some extent before the start of plug-in charging. In the present embodiment, battery pack 10 is determined to be in the high SOC state when maximum voltage Vmax of module MAX is more than or equal to a predetermined voltage P (first predetermined voltage value). As the plug-in charging provides higher charge amount and thus provides larger increase in voltage VBi, the disconnection diagnosis process for battery pack 10 has a higher diagnosis accuracy. However, if battery pack 10 is already in the high SOC state from before the start of plug-in charging, there is no room for increase in voltage VBi with the plug-in charging.

This may not allow for sufficiently high diagnosis accuracy in the disconnection diagnosis process for battery pack 10. Accordingly, as shown in FIG. 5, if maximum voltage Vmax is more than or equal to predetermined voltage P (NO at S24), disconnection diagnosis flag F is switched from ON to OFF (S27).

FIG. 6B shows a voltage distribution of when maximum voltage Vmax before the start of plug-in charging is less than predetermined voltage P (YES at S24). If the SOC of battery pack 10 is relatively low as in this case, ECU 100 determines whether or not voltage difference ΔV between maximum voltage Vmax and minimum voltage Vmin (the voltage of module MIN) (Vmax−Vmin) is less than a reference value REF (S25). If voltage difference ΔV is more than or equal to reference value REF (NO at S25), modules 11 to 1M already have large voltage variations before the start of plug-in charging. This may not allow for high diagnosis accuracy in the disconnection diagnosis process for battery pack 10. Accordingly, if voltage difference ΔV is more than or equal to reference value REF, disconnection diagnosis flag F is switched from ON to OFF (S27). Reference value REF is set preferably according to temperature TB of battery pack 10.

If at least one of the conditions shown in S23 to S25 is not satisfied (NO at any of S23 to S25), ECU 100 determines that the diagnosis accuracy in the disconnection diagnosis process for battery pack 10 may be low, and switches disconnection diagnosis flag F from ON to OFF (S27). On the other hand, if all of the conditions shown in S23 to S25 are satisfied (all YES at S23 to S25), ECU 100 determines that the diagnosis accuracy in the disconnection diagnosis process can be ensured, and maintains disconnection diagnosis flag F at ON (S26). The condition shown in S24 corresponds to the "third condition" according to the present disclosure. The condition shown in S25 corresponds to the "first condition" according to the present disclosure.

Referring back to FIG. 3 and FIG. 4, after execution of the pre-charging determination process of S2, the plug-in charging for vehicle 1 is performed (see S3 and time t2). When the plug-in charging is completed (see time t3), ECU 100 waits until period TB after the completion of the plug-in charging reaches a predetermined time XB (NO at S4).

If period TB after the completion of the plug-in charging reaches predetermined time XB (YES at S4), ECU 100 determines whether or not balancing flag G is ON. If balancing flag G is ON (YES at S5), the balancing determination process is executed (see S6 and time t4).

Once the balancing control for battery pack 10 is executed, the imbalance in voltage distribution among modules 11 to 1M is smaller than before execution of the balancing control (or than without execution of the balancing control). For comparing voltages VBi of modules 11 to 1M with one another in the subsequent disconnection diagnosis process, it is preferable that the balancing control should not be executed and that the imbalance in voltage distribution be maintained. Thus, ECU 100 performs the balancing determination process to determine whether or not the condition suitable for execution of the disconnection diagnosis process is satisfied. In the balancing determination process, if the condition suitable for execution of the disconnection diagnosis process is satisfied, balancing flag G is switched from ON to OFF. In this case (G=OFF at S7), the balancing control is not performed. On the other hand, if ECU 100 determines, as a result of the balancing determination process, that the condition suitable for execution of the disconnection diagnosis process is not satisfied, ECU 100 maintains balancing flag G at ON (G=ON at S7) and executes the balancing control (S8). Since the balancing control has already been described with reference to FIG. 2, the detailed explanation will not be repeated here.

Figure 7:
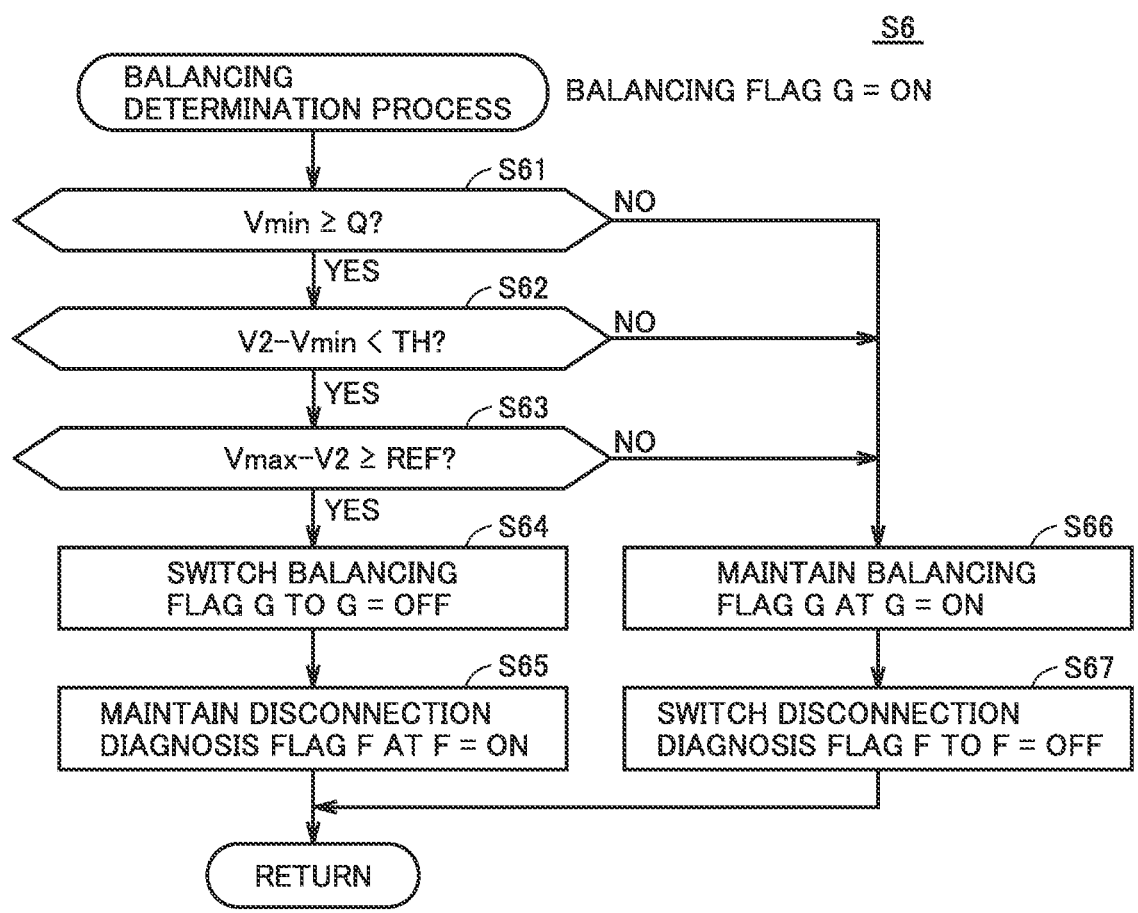
FIG. 7 is a flowchart showing a balancing determination process.

FIG. 7 is a flowchart showing the balancing determination process (the process of S6 in FIG. 4). As described above, as the plug-in charging provides higher charge amount and thus provides larger increase in voltage VBi, the disconnection diagnosis process for battery pack 10 has a higher diagnosis accuracy. Accordingly, in the present embodiment, ECU 100 determines the relationship between minimum voltage Vmin and a predetermined voltage Q at S61. Predetermined voltage Q is more than or equal to predetermined voltage P. If minimum voltage Vmin is more than or equal to predetermined voltage Q (YES at S61), ECU 100 determines that the charge amount for battery pack 10 is sufficiently high, and moves the process to subsequent S62 and S63. Predetermined voltage Q corresponds to the "second predetermined voltage value" according to the present disclosure, and the condition shown in S61 corresponds to the "fourth condition" according to the present disclosure.

For determining whether or not the plug-in charging has provided sufficiently high charge amount, it might be possible to use a measured value of charge amount, instead of voltage VBi. The charge amount is calculated from the detection values of voltage sensors 211 to 21M and from the detection value of current sensor 22. Therefore, the charge amount is affected by the measurement error of current sensor 22, in addition to the measurement errors of voltage sensors 211 to 21M. Further, a failure in current sensor 22 would make the determination impossible. The present embodiment uses only voltage sensors 211 to 21M to determine that the charge amount is sufficiently high, thus free from the influence of measurement error or failure of current sensor 22.

Subsequently, ECU 100 determines whether or not the two conditions shown in S62 and S63 are satisfied. Specifically, at S62, ECU 100 determines whether or not the voltage difference between the second highest voltage V2 and minimum voltage Vmin is less than a threshold value TH. It is preferable to prepare a map (not shown) indicating the correspondence relationship among temperature TB of battery pack 10, reference value REF, and threshold value TH, the threshold value TH being set according to temperature TB and reference value REF. At S63, ECU 100 determines whether or not the voltage difference between maximum voltage Vmax and voltage V2 is more than or equal to reference value REF.

FIG. 8A to FIG. 8C are diagrams for explaining the determination method in the balancing determination process (the processes of S62 and S63 in FIG. 7). FIG. 8A shows a voltage distribution of when all the modules are normal. When all the modules are normal, the differences in voltage VBi among modules 11 to 1M are likely to be small. Thus, the voltage difference between maximum voltage Vmax and voltage V2 is less than reference value REF. The voltage difference between voltage V2 and minimum voltage Vmin is also less than threshold value TH. In such a case, balancing flag G is maintained at ON, while disconnection diagnosis flag F is switched to OFF. That is, the balancing control is executed, while the disconnection diagnosis process is not executed.

FIG. 8B shows a voltage distribution of when disconnection occurred in one module. In the module including a disconnected cell, the amount of change in SOC associated with charging and discharging of battery pack 10 is larger than in the remaining (N−1) modules in which all the cells are normal. Accordingly, as shown in FIG. 8B, the module including the disconnected cell shows a voltage of maximum voltage Vmax, and the maximum voltage Vmax is much higher than the other voltages (voltage V2 to minimum voltage Vmin). Thus, the voltage difference between maximum voltage Vmax and voltage V2 is more than or equal to reference value REF. On the other hand, the modules other than the module that shows maximum voltage Vmax are all normal. In these modules, the differences among voltage V2 to minimum voltage Vmin are relatively small, and the voltage difference between voltage V2 and minimum voltage Vmin is less than threshold value TH.

In the present embodiment, the disconnection diagnosis process is executed when the condition as shown in FIG. 8B is satisfied. Thus, balancing flag G is switched OFF, and disconnection diagnosis flag F is maintained at ON.

FIG. 8C shows a voltage distribution of when disconnection occurred in two modules. In the two modules including disconnected cells, the amount of change in SOC associated with charging and discharging of battery pack 10 is larger than in the remaining (N−2) modules in which all the cells are normal. Accordingly, maximum voltage Vmax and voltage V2 are much higher than the other voltages (voltage V3 to minimum voltage Vmin). Thus, the voltage difference between maximum voltage Vmax and voltage V2 is less than reference value REF, while the voltage difference between voltage V2 and minimum voltage Vmin is more than or equal to threshold value TH.

Although FIG. 8C shows an example voltage distribution for disconnection in two modules, it can also be applied to disconnection in three or more modules. In such a case, the voltage difference between maximum voltage Vmax and voltage V2 is less than reference value REF, and the voltage difference between voltage V2 and minimum voltage Vmin is more than or equal to threshold value TH. That is, the determination method shown in FIG. 8C can determine whether or not disconnection has occurred in two or more modules.

Although the disconnection diagnosis process may be executed when the condition shown in FIG. 8C is satisfied, the present embodiment focuses on determination of the condition shown in FIG. 8B, that is, determination as to whether or not disconnection has occurred in one module. In the present embodiment, the disconnection diagnosis process is not executed when the condition shown in FIG. 8C is satisfied. Specifically, when the condition shown in FIG. 8C is satisfied, balancing flag G is switched OFF and disconnection diagnosis flag F is maintained at ON. The presence or absence of disconnection in two or more modules may be determined by another process, though not explained here.

As described above, whether or not battery pack 10 includes a module having disconnection can be determined by determining whether or not the voltage difference between maximum voltage Vmax and another voltage (voltage V2 in the examples of FIG. 8A to FIG. 8C) is more than or equal to reference value REF (S63), and by determining whether or not the voltage difference between the other voltage (voltage V2) and minimum voltage Vmin is less than threshold value TH (S62). In particular, whether disconnection has occurred in one module or in two or more modules can be distinguished by using the second highest voltage V2 as the other voltage to determine the relationship between the values as explained with reference to FIG. 8B and FIG. 8C.

Referring back to FIG. 4, ECU 100 then waits until the IG-ON operation for vehicle 1 is performed by the user (NO at S9). During this time, ECU 100 may stop its operation (transition to a sleep state). However, until the IG-ON operation, each time a predetermined time (e.g. one hour) has elapsed, ECU 100 starts up and returns the process to S5 to perform the determination of balancing flag G. Thus, when balancing flag G is ON (G=ON at S5), the balancing determination process (S6) is performed at regular intervals.

When the IG-ON operation is performed, ECU 100 determines whether or not disconnection diagnosis flag F is ON (S10). If disconnection diagnosis flag F has been switched to OFF (F=OFF at S10) by the pre-charging determination process (S2) or the balancing determination process (S6), the process is returned to the main routine without executing the subsequent processes. If disconnection diagnosis flag F has been maintained at ON (F=ON at S10) after execution of the pre-charging determination process and the balancing determination process, ECU 100 executes the start-up determination process (S11).

FIG. 9 is a flowchart showing the start-up determination process (the process of S11 in FIG. 4). With reference to FIG. 9, at S111, ECU 100 determines whether or not a period TC from execution of the balancing determination process is more than or equal to a predetermined time XC (see time t5 in FIG. 3). If period TC from execution of the balancing determination process is more than or equal to predetermined time XC and is sufficiently long (YES at S111), the process is moved to S112.

As in the balancing determination process explained with reference to FIG. 7 (see S62), the process of S112 in the start-up determination process determines whether or not the voltage difference between the second highest voltage V2 and minimum voltage Vmin is less than threshold value TH. That is, these determinations are performed in both the balancing determination process and the start-up determination process.

That is because the length of period TC, after the completion of the plug-in charging to the IG-ON operation by the user, can take various values. For example, the IG-ON operation for vehicle 1 may be performed immediately after the completion of the plug-in charging, or may not be performed until after an elapse of one week or a loner period of time (for example, one year). If the IG-ON operation is not performed for a long period of time, the state (voltage VBi of each module) of battery pack 10 may differ between at the time of execution of the balancing determination process and at the time of execution of the start-up determination process. For example, at the time of execution of the balancing determination process, there may be only one module having disconnection; whereas, at the time of execution of the start-up determination process, there may be two or more modules having disconnection. Accordingly, S112 in the start-up determination process determines again whether or not the voltage difference between voltage V2 and minimum voltage Vmin is less than threshold value TH.

If the voltage difference between voltage V2 and minimum voltage Vmin is less than threshold value TH at S112 (YES at S112), ECU 100 maintains disconnection diagnosis flag F at ON (S113). If the voltage difference between voltage V2 and minimum voltage Vmin is more than or equal to threshold value TH (NO at S112), ECU 100 switches disconnection diagnosis flag F from ON to OFF (S114).

If period TC is short, there is not much point in separately performing the process of S62 in the balancing determination process and the process of S112 in the start-up determination process. Therefore, if period TC is less than predetermined time XC (NO at S111), disconnection diagnosis flag F is switched OFF (S114).

Referring back to FIG. 4, at S12, ECU 100 determines again whether or not disconnection diagnosis flag F is ON. If disconnection diagnosis flag F has been switched to OFF (NO at S12) by the start-up determination process (S11), the process is returned to the main routine without executing the disconnection diagnosis process (S13). If disconnection diagnosis flag F is still ON (YES at S12) after execution of the start-up determination process, ECU 100 executes the disconnection diagnosis process.

Figure 10:
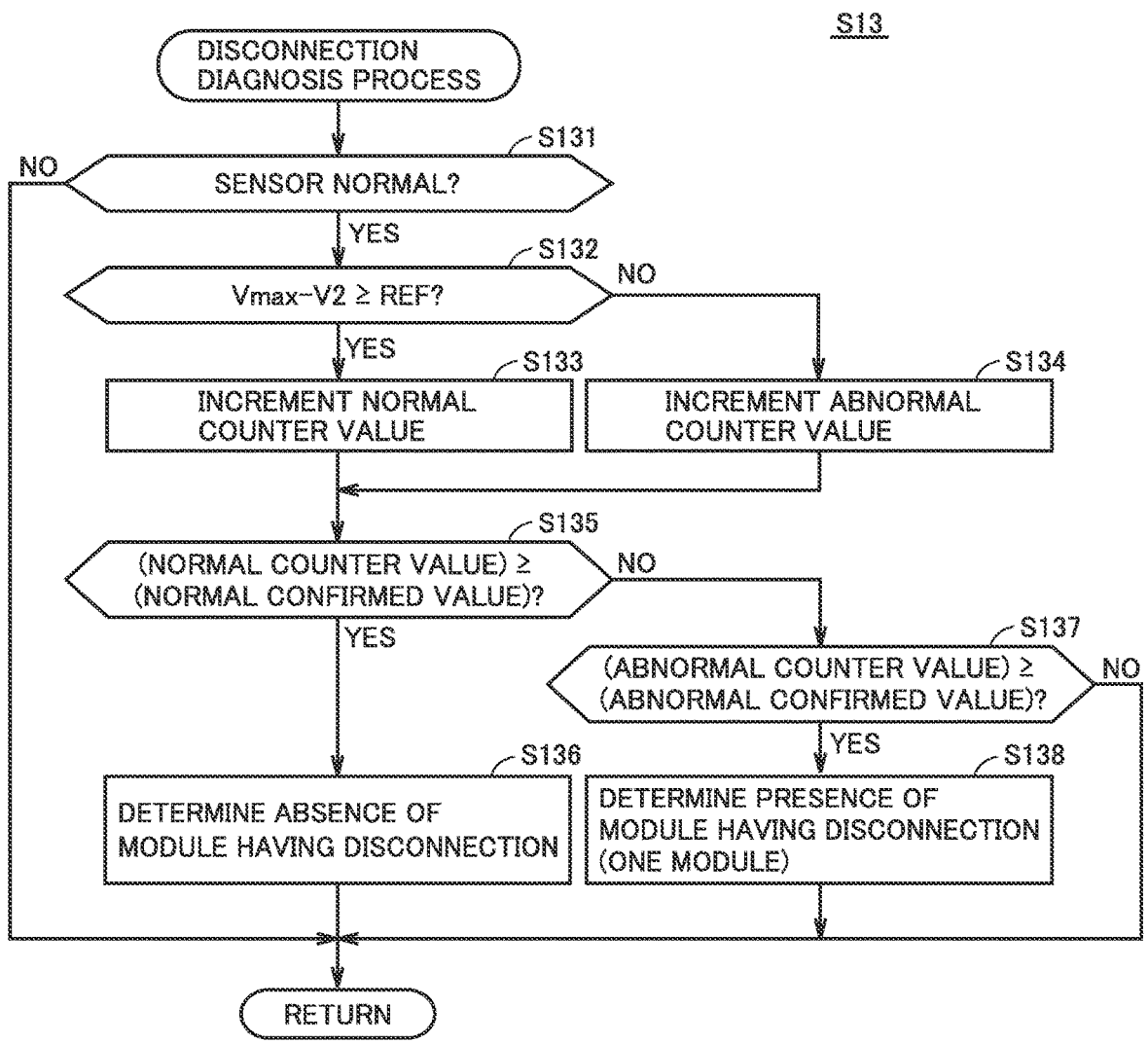
FIG. 10 is a flowchart showing an abnormality diagnosis process.

FIG. 10 is a flowchart showing the abnormality diagnosis process (the process of S13 in FIG. 4). Memory 102 of ECU 100 stores a counter (not shown) for managing provisional determination results about the presence or absence of disconnection in battery pack 10. This counter counts the normal counter value and the abnormal counter value. The initial value of each counter value (for example, the value at the time of manufacturing vehicle 1) is 0 (zero).

With reference to FIG. 10, after confirming that each sensor (voltage sensor 21 and current sensor 22) in monitoring unit 20 is normal (YES at S131), ECU 100 determines whether or not the voltage difference between maximum voltage Vmax and the second highest voltage V2 is more than or equal to reference value REF (S132). If the voltage difference between maximum voltage Vmax and voltage V2 is more than or equal to reference value REF (YES at S132), ECU 100 provisionally determines that no disconnection has occurred in battery pack 10, and increments the normal counter value by one (S133). If the voltage difference between maximum voltage Vmax and voltage V2 is less than reference value REF (NO at S132), ECU 100 provisionally determines that disconnection may have occurred in battery pack 10, and increments the abnormal counter value by one (S134). The condition shown in S132 corresponds to the "second condition" according to the present disclosure.

At S135, ECU 100 determines whether or not the normal counter value has reached the value that confirms the determination that battery pack 10 is normal (normal confirmed value). If the normal counter value has reached the normal confirmed value (YES at S135), ECU 100 confirms the determination that battery pack 10 is normal, i.e., battery pack 10 does not include a module having disconnection (S136).

If the normal counter value has not reached the normal confirmed value (NO at S135), ECU 100 moves the process to S137, and determines whether or not the abnormal counter value has reached the value that confirms the determination that battery pack 10 is abnormal (abnormal confirmed value). If the abnormal counter value has reached the abnormal confirmed value (YES at S137), ECU 100 confirms the determination that battery pack 10 is abnormal, i.e., battery pack 10 includes a module having disconnection (S138). If the abnormal counter value has not reached the abnormal confirmed value (NO at S137), the process is returned to the main routine without confirming the determination.

As described above, according to the present embodiment, if the voltage difference between maximum voltage Vmax and minimum voltage Vmin was less than reference value REF before execution of the plug-in charging (YES at S25) and the voltage difference between maximum voltage Vmax and another voltage (voltage V2, in particular) is more than or equal to reference value REF after execution of the plug-in charging (YES at S132), then it is determined that the plug-in charging for battery pack 10 has produced voltage differences and thus an abnormality has occurred in any of the modules (specifically, the module that shows maximum voltage Vmax).

The voltage difference between maximum voltage Vmax and minimum voltage Vmin having been less than reference value REF before execution of the plug-in charging means that the voltage differences among the modules were sufficiently small due to, for example, proper balancing control before execution of the plug-in charging. The voltage difference between maximum voltage Vmax and voltage V2 being more than or equal to reference value REF after execution of the plug-in charging means that there is a module (the module that shows maximum voltage Vmax) that has a large voltage difference from another module after execution of the plug-in charging. Therefore, according to the present embodiment, the presence or absence of disconnection in the modules of battery pack 10 can be determined with higher accuracy than with no determination as to whether or not the voltage difference between maximum voltage Vmax and minimum voltage Vmin is less than reference value REF.

Plug-in charging that provides only low charge amount for battery pack 10 will produce only small voltage differences among the modules even when battery pack 10 includes an abnormal module. On the other hand, if maximum voltage Vmax is less than predetermined voltage P before the plug-in charging (see S24 in FIG. 5), and minimum voltage Vmin is more than or equal to predetermined voltage Q after the plug-in charging (see S61 in FIG. 7), then it indicates that the plug-in charging has provided sufficiently high charge amount for battery pack 10. Accordingly, the plug-in charging produces larger voltage differences among the modules. Thus, the present embodiment can further improve the accuracy in determination of the presence or absence of disconnection in the modules of battery pack 10.

Execution of the balancing control for battery pack 10 will reduce the voltage differences among the modules. Accordingly, in the present embodiment, if the voltage difference between voltage V2 and minimum voltage Vmin is less than threshold value TH (YES at S62 in FIG. 7), and the voltage difference between maximum voltage Vmax and voltage V2 is more than or equal to reference value REF (YES at S63), the balancing control is not executed (S64), in preparation for the disconnection diagnosis. On the other hand, if the voltage difference between voltage V2 and minimum voltage Vmin is more than or equal to threshold value TH (NO at S62), or if the voltage difference between maximum voltage Vmax and voltage V2 is less than reference value REF (NO at S63), the balancing control is executed (S66), with no execution of the disconnection diagnosis process. This reduces the voltage differences among the modules and expands the voltage range of charging and discharging of battery pack 10, thus enabling full use of battery pack 10.

The present embodiment describes the configuration for the plug-in charging control as an example of the "external charging control" according to the present disclosure. However, the "external charging control" may be so-called wireless charging control for wirelessly transferring electric power from a power transmitting apparatus outside of the vehicle to an on-board power receiving apparatus.

Although an embodiment of the present disclosure has been described, it should be understood that the embodiment disclosed herein is by way of example only in every respect, and is not to be taken by way of limitation. The scope of the present disclosure is defined by the terms of the appended claims and is intended to include any modification within the scope and meaning equivalent to the terms of the claims.

What is claimed is:

1. A secondary battery system mountable on a vehicle, comprising:
    a battery pack to be charged by external charging control with electric power supplied from outside of the vehicle, the battery pack including a plurality of modules connected in series to one another, each of the plurality of modules including a plurality of cells connected in parallel to one another;
    a plurality of voltage sensors each provided for a corresponding one of the plurality of modules and each configured to detect a voltage of a corresponding one of the plurality of modules; and
    a controller configured to execute the external charging control,
    the controller being configured to, if a first condition and a second condition are satisfied, diagnose an abnormality in which a current path of a cell breaks, the cell being included in a module among the plurality of modules, the first condition being a condition that a voltage difference between a maximum voltage value and a minimum voltage value among a plurality of voltage values is less than a reference value before execution of the external charging control, each of the plurality of voltage values being detected by a corresponding one of the plurality of voltage sensors, the second condition being a condition that a voltage difference between the maximum voltage value and a voltage value other than the maximum voltage value and the minimum voltage value among the plurality of voltage values is more than the reference value after execution of the external charging control.

2. The secondary battery system according to claim 1, wherein the controller is configured to diagnose the abnormality in the module, if a third condition and a fourth condition are satisfied in addition to the first condition and the second condition, the third condition being a condition that the maximum voltage value is less than a first predetermined voltage value before execution of the external charging control, the fourth condition being a condition that the minimum voltage value is more than a second predetermined voltage value after execution of the external charging control, the second predetermined voltage value being more than or equal to the first predetermined voltage value.

3. The secondary battery system according to claim 2, wherein the controller is configured to determine whether or not the second condition and the fourth condition are satisfied, if a start-up operation for a traveling system of the vehicle is executed by a user after execution of the external charging control.

4. The secondary battery system according to claim 3, further comprising a plurality of switching elements each connected in parallel to a corresponding one of the plurality of modules, wherein if a balancing condition that a SOC difference among the plurality of modules is more than a predetermined value is satisfied, the controller is configured to execute balancing control for reducing the SOC difference by turning on any of the plurality of switching elements; and during a period after execution of the external charging control to execution of the start-up operation, if at least one of the first condition and the third condition is not satisfied, the controller is configured to execute the balancing control when the balancing condition is satisfied, and if the first condition and the third condition are both satisfied, the controller is configured not to execute the balancing control when the balancing condition is satisfied.

5. The secondary battery system according to claim 1, wherein the voltage value other than the maximum voltage value and the minimum voltage value is a second highest voltage value among the plurality of voltage values, and the controller is configured to diagnose the abnormality in the module that shows the maximum voltage value, if a condition that a voltage difference between the second highest voltage value and the minimum voltage value is less than a threshold value is satisfied after execution of the external charging control.

6. A method for diagnosing abnormality in a battery pack mounted on a vehicle, the battery pack including a plurality of modules to be charged by external charging control with electric power supplied from outside of the vehicle, the plurality of modules being connected in series to one another, each of the plurality of modules including a plurality of cells connected in parallel to one another, the method comprising:

detecting voltages of the plurality of modules using a plurality of voltage sensors, each of the plurality of voltage sensors being provided for a corresponding one of the plurality of modules; and if a first condition and a second condition are satisfied, diagnosing an abnormality in which a current path of a cell breaks, the cell being included in a module among the plurality of modules, the first condition being a condition that a voltage difference between a maximum voltage value and a minimum voltage value among a plurality of voltage values is less than a reference value before execution of the external charging control, each of the plurality of voltage values being detected by a corresponding one of the plurality of voltage sensors, the second condition being a condition that a voltage difference between the maximum voltage value and a voltage value other than the maximum voltage value and the minimum voltage value among the plurality of voltage values is more than the reference value after execution of the external charging control.

* * * * *